(12) United States Patent
Takahashi

(10) Patent No.: US 7,400,471 B2
(45) Date of Patent: Jul. 15, 2008

(54) RAMP LOADING UNIT INCLUDING MEANS FOR REDUCING POWDER COLLECTED ON HEAD SUPPORT PART, AND DISK DRIVE INCLUDING SAME

(75) Inventor: Shinichi Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 363 days.

(21) Appl. No.: 10/916,161

(22) Filed: Aug. 11, 2004

(65) Prior Publication Data

US 2005/0018354 A1 Jan. 27, 2005

Related U.S. Application Data

(63) Continuation of application No. PCT/JP02/01225, filed on Feb. 13, 2002.

(51) Int. Cl.
*G11B 5/48* (2006.01)
(52) U.S. Cl. .................................................. 360/245.8
(58) Field of Classification Search ............. 360/254.8, 360/254.4, 255.3, 255.7
See application file for complete search history.

(56) References Cited

U.S. PATENT DOCUMENTS

| | | | | |
|---|---|---|---|---|
| 5,526,206 | A * | 6/1996 | Shimizu ................... | 360/254.8 |
| 6,122,130 | A * | 9/2000 | Boutaghou et al. ........ | 360/254.8 |
| 6,226,155 | B1 | 5/2001 | Watanabe et al. ......... | 360/254.8 |
| 6,275,356 | B1 * | 8/2001 | Boutaghou et al. ........ | 360/254.8 |
| 6,278,584 | B1 * | 8/2001 | Zhang et al. ............. | 360/254.8 |
| 6,449,128 | B1 * | 9/2002 | Abe ........................ | 360/254.8 |

FOREIGN PATENT DOCUMENTS

| | | |
|---|---|---|
| EP | 1011096 | 6/2000 |
| JP | 10-302421 | 11/1998 |
| JP | 11-250603 | 9/1999 |
| JP | 2000-030387 | 1/2000 |
| JP | 2000-132937 | 5/2000 |
| JP | 2000-259320 | 9/2000 |
| JP | 2000-298964 | 10/2000 |
| JP | 2001-173213 | 6/2001 |
| JP | 2002-074874 | 3/2002 |

* cited by examiner

*Primary Examiner*—David Davis
(74) *Attorney, Agent, or Firm*—Greer, Burns & Crain, Ltd.

(57) ABSTRACT

A ramp loading unit, for use in a disk drive that includes a head and a record carrier, that includes a holding part that holds a head support part apart from the record carrier. The ramp loading unit also includes a sliding part which the head support part elastically contacts. The sliding part includes a patterned sliding surface with a protruding part that has a width that can partially contact the head support part, wherein the position of the protruding part changes in the width direction of the sliding surface along the length direction of the sliding surface orthogonal to the width direction, so that a contact position of the head support part with the protruding part changes as the head support part slides on the sliding part in the length direction of the sliding surface.

8 Claims, 7 Drawing Sheets
(1 of 7 Drawing Sheet(s) Filed in Color)

RAMP LOADING UNIT INCLUDING MEANS FOR REDUCING POWDER COLLECTED ON HEAD SUPPORT PART, AND DISK DRIVE INCLUDING SAME

This application is a continuation based on PCT International Application No. PCT/JP02/01225, filed on Feb. 13, 2002, which is hereby incorporated by reference herein in its entirety as if fully set forth herein.

BACKGROUND OF THE INVENTION

The present relates generally to a mechanism for holding a head at a position outside a record carrier. The present invention is suitable, for example, for a hard disc drive ("HDD").

Available electronic information contents have explosively increased with the recent rapid technology developments, as in the Internet. Thus, larger-capacity magnetic storages, typified by HDDs, have been increasingly demanded to store such a large amount of information.

A slider mounted with a head floats on a disc for recording and reproducing in the HDD. As a relationship between the slider and the disc at the time of activation and halt of the disc, referred to as an interface, there are a contact start stop ("CSS") system in which the slider contacts the disc, and a ramp or dynamic loading system in which the slider retreats from the disc at the time of stop of the disc and is held by a holder called a ramp. The conventional HDD interface mainly adopts the CSS system.

The CSS system would, however, cause crashes (or damage the disc) if frictions increase at the time of stop and sliding. In addition, since the slider is easily absorbed onto the disc, the CSS system requires a texture process that forms fine corivexes and concaves on the disc surface so as to prevent the absorption. This texture process increases cost, and becomes difficult particularly due to the reduced floating amount of the slider in the recent higher recording density and the associative demands for the flatness of the disc surface.

Accordingly, the ramp loading system has recently attracted attentions. In the ramp loading system, a non-contact between the slider and the disc when the rotation of the disc starts and stops causes no friction that would otherwise damage the disc or no absorption between them. Additional advantages are that no texture process is necessary, and the head floating amount can be reduced. In the ramp loading system, a suspension that supports the slider slides on a sliding surface on the ramp while contacting, the ramp with an elastic force in loading the slider on the disc and unloading the slider from the disc.

BRIEF SUMMARY OF THE INVENTION

The ramp loading system typically makes the ramp of resin and the suspension of metal. Therefore, the slider's repetitive sliding actions disadvantageously generate abrasive powder due to abrasions. The abrasive powder adheres to the suspension and drops on the disc when the slider is loaded over the disc, and adheres to the slider that moves above the disc. The abrasive powder is not welcome because it may possibly cause crashes.

On the other hand, one method suggests changing of the ramp's material so as to prevent its abrasions. This method properly changes, for example, ramp's forming condition; such as a pressurizing condition and a thermal process condition. However, this method is insufficient to prevent generations of the abrasive powder. In addition, Japanese Patent' Publication No. 2000-132934 proposes a method of removing the abrasive powder by providing a groove in the ramp at a home position at which the ramp holds the suspension. Nevertheless, the instant inventor has found that it is insufficient to remove the abrasive powder using the groove disclosed by this reference.

Accordingly, it is an exemplary object of the present invention to provide a ramp loading unit and a drive having the same, which provide stable recording and reproducing actions by reducing dangers of crashes.

A ramp loading unit according to one aspect of the present invention includes a holding part that holds a head support part at a position apart from a record carrier, the head support part supporting a head that records information in and reproduces the information from the record carrier, a sliding part which the head support part elastically contacts when the head is to be loaded over the record carrier and the head is to be unloaded from the record carrier, and a member that changes a contact position on the head support part with the sliding part when the head support part slides on the sliding part. A drive according to another aspect of the present invention has this ramp loading unit.

First, the instant inventor obtained a result shown in FIG. 10 as a result of experiments in which a head support part (which is a lift tab 20, which will be described later) which elastically contacts a sliding part having a flat surface was repetitively slid on a sliding surface and generations of the abrasive powder are observed. Here, FIG. 10A indicates the amount of abrasive powder that adheres onto the head support part after 100,000 (or 100K) times of sliding actions. FIGS. 10B and 10C indicate the amounts of abrasive powder that adheres onto the head support part after 300K and 500K times of sliding actions, respectively. A color photograph of FIG. 10 is submitted with the instant application. Each figure indicates a bottom view of the head support part having a boat form. White longitudinal part that extends at the center defines a bottom surface of the boat-shaped head support part. Black part is a boat-shaped side part of the head support part viewed from the bottom. Center misty white part represents abrasive powder. As understood from FIG. 10, the head support part contacts the sliding part at almost one point, and the accumulation of the abrasive powder concentrates on that point of the head support part.

As a result, the abrasive powder quickly accumulates and coheres, and the weight increases. Then, the abrasive powder drops on the record carrier. In addition, it is difficult to remove the cohering abrasive powder from the disc due to its size and the weight. On the other hand, the inventive ramp loading unit varies a contact position on the head support part with the sliding part, and does not cause concentration of the accumulated abrasive powder on the head support part. As a result of the (flatly, for example) dispersed accumulation of the abrasive powder on the head support part in its longitudinal direction, the abrasive powder does not cohere and is less likely to drop. Even if it drops, the abrasive powder is smaller, lighter, and less influential than the cohered one. Thus, in comparison with case where the abrasive powder concentrates on one point on the head support part, the dropping amount onto the record carrier reduces and the dropping abrasive powder is less influential. None of the above prior art does not disclose a concept of entirely dispersing the abrasive powder that would otherwise concentrate on one point, and does not exhibit the inventive operation.

Lubricant is preferably applied onto the sliding part to reduce a generation of the abrasive powder. The lubricant can use, for example, fomblin system.

The sliding part includes a concave and convex sliding surface that faces the head support part, and contacts the head support part via a convex part of the sliding surface, wherein the member includes a pattern of the convex part formed on the sliding surface. This case contributes a reduction of the abrasive powder, and provides a meritorious operation in which when the head support part passes through the concave part, the abrasive powder drops in it.

In order to change the contact position on the head support part with the convex part, the convex part may have a constant height or variable heights or a combination thereof. The number of convex parts may be one or more.

The concave and convex sliding surface may include plural convex parts with such heights that the head support part travels different heights when the head support part moves from one convex part to another convex part. When the head support part travels two convex parts through a step, a slight impact is applied to the head support part and the abrasive powder that adheres to the head support part is likely to drop in the concave part between them.

The concave part must intersect with a straight line orthogonal to a longitudinal direction of the sliding part from the holding part to the record carrier to the extent that the head support part moves on the sliding part. This is because unless the concave part intersects, the head support part drops in the concave part in the sliding surface.

If necessary, the sliding part may include a cover that prevents vibrations of the head support part, and the head support part may be located between the cover and the sliding surface. Thereby, the slider is prevented from colliding with the disc as a result of that the head support part vibrates on the convex and concave surface and the slider is loaded over the disc at that state of the head support part.

Preferably, the convex part may intersect a line parallel to a locus drawn by the head support part to that extent that the head support part moves on the sliding part. A line parallel to the locus drawn by the head support part is, for example, concentric around an axis when the head support part rotates around the axis. When the locus drawn by the head support part is parallel to a pattern of the convex part, the contact position on the head support part with the convex part seldom fluctuates (particularly when the convex part has the constant height).

Other objects and further features of the present invention will become readily apparent from the following description of the embodiments with reference to accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF PREFERRED EMBODIMENT

Figure 1:
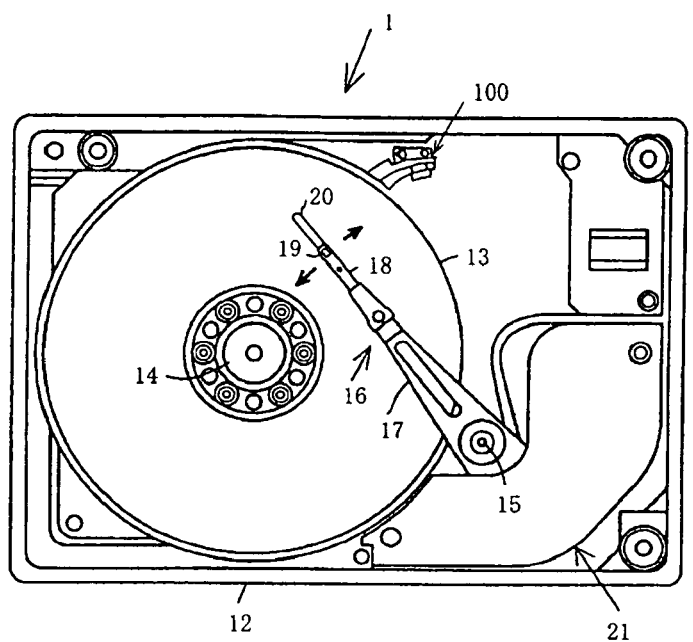
FIG. 1 is a plane view of an internal structure of a hard disc drive ("HDD") according to one embodiment of the present invention.

A description will be given of a HDD 1 according to one embodiment of the present invention with reference to the accompanying drawings. The HDD 1 includes, as shown in FIG. 1, one or more magnetic discs 13 as a record carrier, a spindle motor 14, a magnetic head part, and a ramp loading unit 100 in a housing 12. Here, FIG. 1 is a schematic plane view of the HDD 1's internal structure. The number of magnetic discs 13 in the instant embodiment is illustratively one.

The housing 12 is made, for example, of aluminum die casting or stainless, and has a rectangular parallelepiped shape to which a cover (not shown) is coupled so as to seal its internal space. Each magnetic disc 13 in this embodiment has a high recording density, such as 100 Gb/in$^2$ or higher, and is mounted on a spindle of the spindle motor 14.

The spindle motor 14 rotates the magnetic disc 13 at a high speed, such as 7200 rpm and 10,000 rpm, and includes a brushless DC motor (not shown) and a spindle as its rotor part. For example, when two magnetic discs 13 are used, a disc, a spacer, a disc, and a clamp are stacked in this order on the spindle, and fixed by a bolt engaged with the spindle. Unlike this embodiment, the magnetic disc 13 may be a disc having a hub without a center hole, and the spindle may rotate the disc through the hub.

The magnetic head part includes a slider 19, and an actuator 21 that serves as a mechanism for positioning and driving the slider 19.

Figure 2:
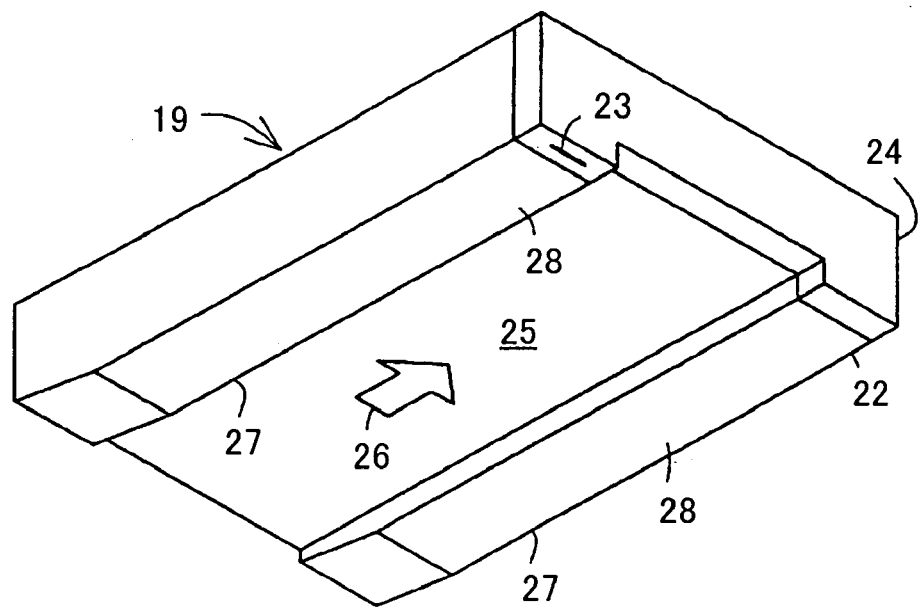
FIG. 2 is an enlarged perspective view of a slider in the HDD shown in FIG. 1.

The slider 19 includes, as shown in FIG. 2, a slider body 22 having an approximately rectangular parallelepiped shape made of $Al_2O_3$—TiC (altic), and a head-device built-in film 24 united with at an air outflow end of the slider body 22 and made of $Al_2O_3$ (alumina). The film 24 contains a built-in read/write head 23. Here, FIG. 2 is an enlarged perspective view of the slider 19. The slider body 22 and head-device built-in film 24 define a floatation surface 25 as a surface opposite to a medium, i.e., the magnetic disc 13, for catching air current 26 generated from the rotating magnetic disc 13.

A pair of rails 27 are formed on the floatation surface 25, extending from an air inflow end to the air outflow end. A so-called air-bearing surface (referred to as "ABS" hereinafter) 28 is defined at a top surface of each rail 27. The buoyancy is generated at the ABS 28 according to an act of the air current 26. The head 23 embedded in the head-device built-in film 24 exposes at the ABS 28. The floatation system of the slider 19 is not limited to this form, but may use a known dynamic pressure lubricating system, a known static pressure lubricating system, a known piezoelectric control system, and any other known floatation system. As discussed below, the instant embodiment uses a dynamic or ramp loading system that retreats or unloads the slider 19 from the disc 13 before the disc 13 stops, holds the slider 19 on the ramp loading unit 100 located outside the disc 13 in a non-contact manner between the slider 19 and the disc 13, and drops or load the slider 19 from the holding part over the disc 13 when the disc 13 is run.

The head 23 includes a magnetoresistive ("MR" hereinafter)/inductive composite head that contains an inductive head device for writing binary information into the magnetic disc 13 using a magnetic field induced by a conductive coil pattern (not shown), and a MR head device for reading resistance as binary information changing according to a magnetic field generated by the magnetic disc 13. The MR head device may use any type, such as a giant magnetoresistive ("GMR") type including both a Current in Plane ("CIP") structure and a Current Perpendicular to Plane ("CPP") structure, a tunneling magnetoresistive type ("TMR"), and an anisotropic magnetoresistive ("AMR") type.

Turning back to FIG. 1, the actuator 21 includes a voice coil motor (not shown in FIG. 1), a support shaft 15, and a carriage 16.

The voice coil motor can use any technology known in the art, and a detailed description thereof will be omitted. For example, the voice coil motor includes a permanent magnet fixed onto an iron plate fixed in the housing 12, and a mobile magnet fixed onto the carriage 16. The support shaft 15 is inserted into a cylindrical hollow hole in the carriage 16, and arranged such that it extends perpendicular to the paper surface in FIG. 1 in the housing 12.

The carriage 16 includes a rigid arm 17 that can rotate or swing around the support shaft 15, and a suspension 18 that is attached to a tip of the corresponding arm 17 and extends forward from the arm 17. The suspension 18 can be, for example, a Watlas type suspension made of stainless steel, which uses a gimbal spring (not shown) to cantilever the slider 19 and a lift tab 20 at the tip. The suspension 18 also supports a wiring part connected to the slider 19 through a lead, etc. The wiring part is small and omitted in FIG. 1. The sense current, read-in data, and read-out data are supplied and output between the head 23 and the wiring part through such a lead. The suspension 18 applies an elastic force to the slider 19 and the lift tab 20 against the surface of the magnetic disc 13.

The lift tab 20 extends along the center axis of the suspension 18 from the slider 19 opposite to the support shaft 15, and serves as an engagement part with the ramp loading unit 100. The lift tab 20 has a boat shape that slides on a sliding surface 160, which will be described later and, for example, is integrated with the suspension 18 and made of the same material as that of the suspension 18. The lift tab 20 slides on the ramp loading unit 100 and serves to load and unload the slider 19. In other words, the lift tab 20 loads the slider 19 from the ramp loading unit 100 over the magnetic disc 13 after driving of the magnetic disc 13 starts, and unloads the slider 19 from the magnetic disc 13 to the ramp loading unit 100 so as to hold the slider 19 on the ramp loading unit 100 before driving of the magnetic disc 13 stops.

Figure 3:
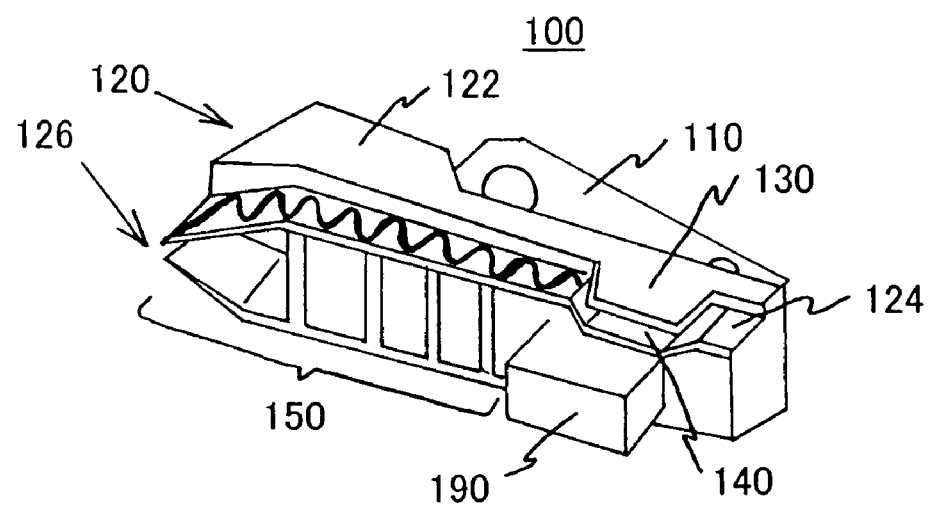
FIG. 3 is a perspective view of the ramp loading unit in the HDD shown in FIG. 1.
Figure 4:
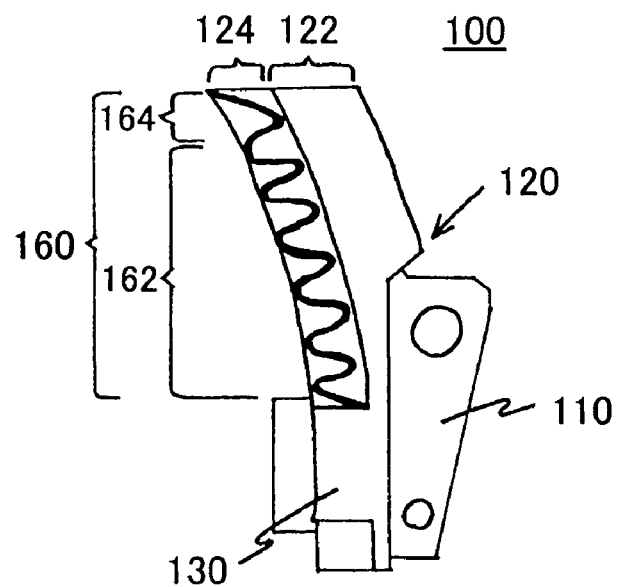
FIG. 4 is a plane view of the ramp loading unit in the HDD shown in FIG. 1.

Referring to FIGS. 1, 3 and 4, the ramp loading unit 100 is provided outside or near the outermost circumference of the magnetic disc 13. Here, FIGS. 3 and 4 are perspective and plane views of the ramp loading unit 100. While the instant embodiment conveniently describes the ramp loading unit 100 used for one magnetic disc 13, the present invention is not limited to this embodiment.

Referring to FIGS. 3 and 4, the ramp loading unit 100 includes a fixture part 110 fixed on a bottom wall of the housing 12 via screws, and a ramp 120 coupled with the fixture part 110 and arranged outside the magnetic disc 13. The ramp 120 includes a base 122 coupled with the fixture part 110, and a guide part 124 that guides and holds the lift tab 20, and contacts the lift tab 20 slidably. An outermost circumference of the magnetic disc 13 is partially inserted into a U-shaped groove 126 formed at the top of the guide part 124.

Figure 9:
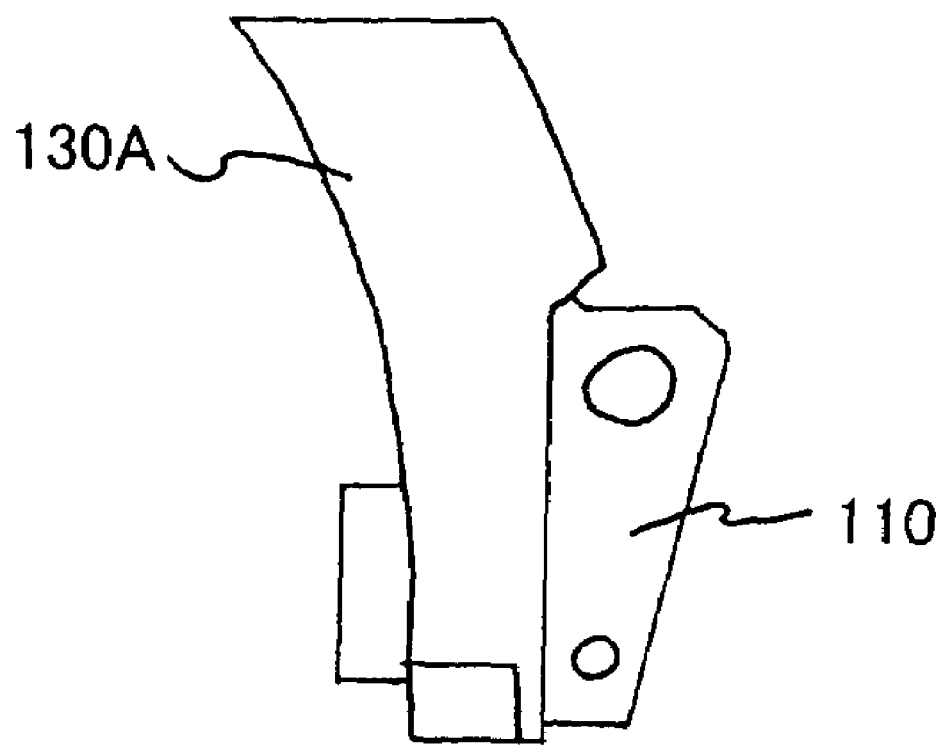
FIG. 9 is a plane view of a variation of the ramp loading unit shown in FIG. 4.
Figure 10A:
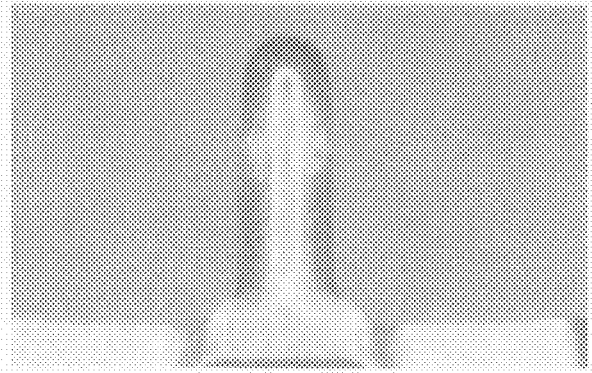
FIG. 10 shows photographs indicative of a relationship between the abrasive powder generating positions and amounts generated due to the lift tab's sliding in the conventional HDD and the number of slides.
Figure 10B:
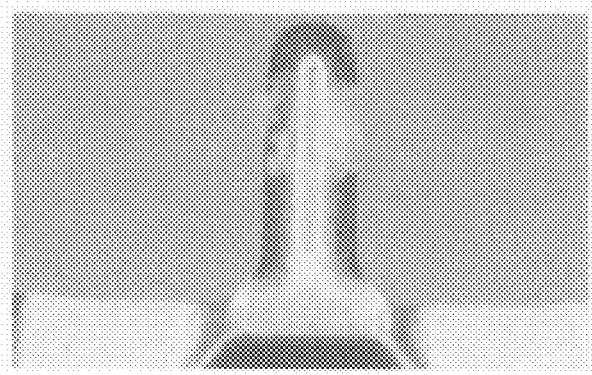
Figure 10C:
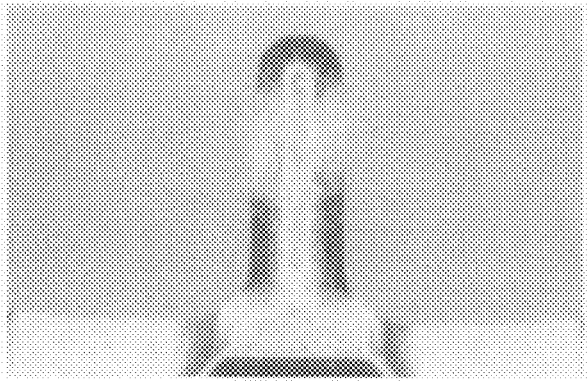

The base 122 includes a cover 130 that prevents the lift tab 20 from vibrating and deviating from a holding part 140, which will be described later. In an alternative embodiment, as shown in FIG. 9, the cover 130 may be replaced with a cover 130A that extends over the sliding surface 160 and prevents the lift tab 20 from vibrating on the convex and concave sliding surface 160 and deviating from the sliding surface 160. Thereby, the ramp loading unit 100 can prevent the slider 19 from colliding with the magnetic disc 13 as a result of that the slider 19 is loaded over the magnetic disc 13 while the lift tab 20 vibrates. Here, FIG. 9 is a plane view of a variation of the cover 130 shown in FIG. 4.

The guide 124 includes a holding part 140, a sliding part 150, and a pressure plate 190. While the holding part 140 and the sliding surface 160, which will be described later, are also formed at the lower side of the guide part 124, only the upper side is addressed for convenience.

The holding part 140 is a concave part that holds the lift tab 20 that supports the slider 19, and the holding part 140 is a home position for the lift tab 20 in the ramp 120. While a concave shape of the holding part 140 is a U-shape that slightly opens at both sides in the instant embodiment, other shapes, such as a V shape, may be used.

The sliding part 150 has a sliding surface 160 arranged at a height such that the lift tab 20 can contact the sliding surface 160 with a predetermined elastic force. The sliding surface 160 has, as shown in FIG. 4, an arc shape with a predetermined width corresponding to an arc locus drawn by the lift tab 20, and includes a flat part 162 and an inclined part 164. The flat part 162 is connected to the holding part 140, and extends parallel to a surface of the magnetic disc 13. The inclined surface 164 that inclines from the flat part 162 to the magnetic disc 13 extends up to the vicinity of the outermost circumference of the magnetic disc 13.

The ramp loading unit 100 includes means for fluctuating a contact position of the lift tab 20 with the sliding part 150 while the lift tab 20 slides on the sliding part 150. This means prevents accumulations of the abrasive powder on the lift tab 20 from concentrating on one point on the lift tab 20. This means may be means for flatting, along a longitudinal direction of the lift tab 20, the abrasive powder that has accumulated on the lift tab 20. This means enables the abrasive powder to spread out and accumulates over the bottom surface of the lift tab 20, and thus the accumulating speed of the abrasive powder that accumulates at each point on the lift tab 20 becomes slower than one in which the abrasive powder accumulates at one point. Each point on the bottom surface of the lift tab 20 can hold a certain amount of abrasive powder with a certain weight. When the amount and the weight of the abrasive powder become excessive, the abrasive powder is likely to drop. The small accumulating speed of the abrasive powder at each point of the lift tab 20 reduces the dropping amount per unit time in the instant embodiment.

While the instant embodiment implements this means by a concave and convex (patterned) shape formed on the sliding surface 160, more specifically a pattern of the convex (protruding) part 170, the present invention is not limited to this embodiment and broadly covers mechanical, electrical and other means for changing a contact position between the lift tab 20 and the sliding part 150. For example, the sliding surface 160 may form a flat surface, the cover 130A may be provided, as shown in FIG. 9, and one or more convex (protruding) parts that contact the lift tab 20 are dispersed on the bottom surface of the cover 130A that faces the lift tab 20.

This structure enables the convex (protruding) parts to change a direction in which the lift tab 20 applies the elastic force to the sliding surface, and a contact position of the lift tab 20 with the sliding surface.

Figure 5:
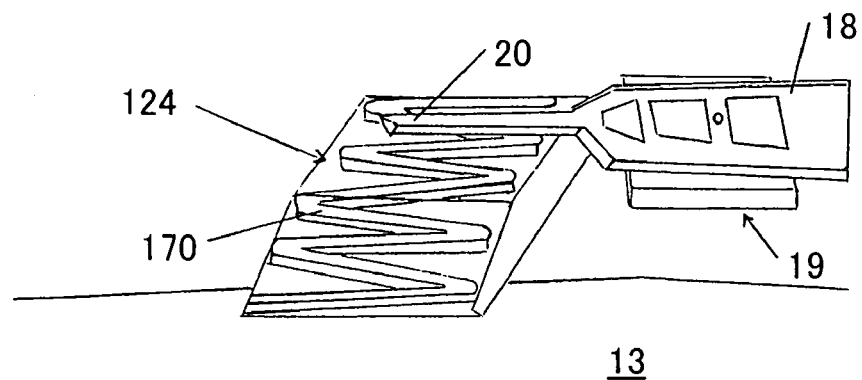
FIG. 5 is a schematic enlarged perspective view of a sliding surface of the ramp loading unit shown in FIG. 3.
Figure 6A:
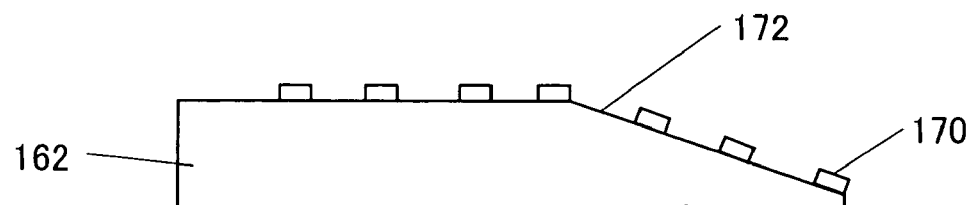
FIG. 6 shows a right-side sectional view, a left-side sectional view and a plane view of the sliding surface shown in FIG. 5, facing the magnetic disc.
Figure 6B:
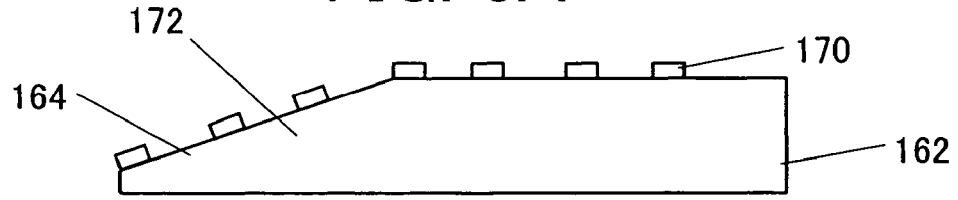
Figure 6C:
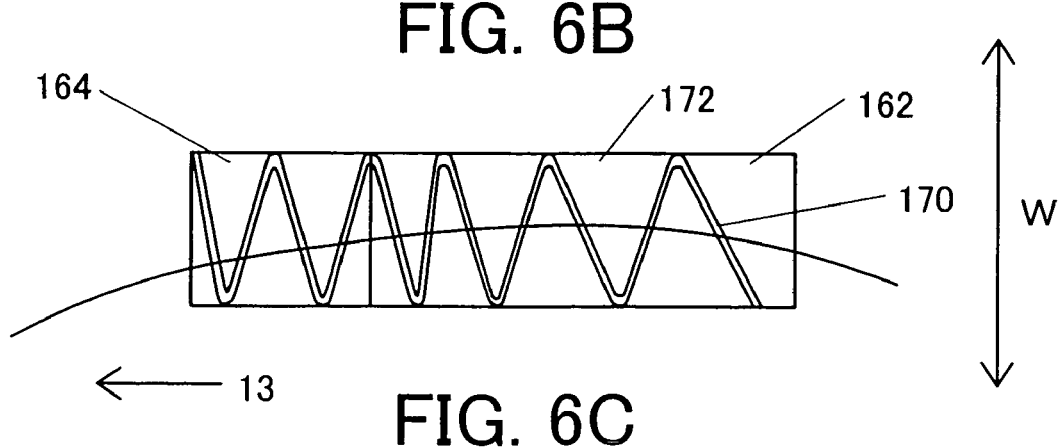

Referring to FIGS. 5 and 6, the convex (protruding) part 170 is formed on the sliding surface 160. Here, FIG. 5 is a schematic enlarged perspective view of the sliding surface 160 of the ramp loading unit 100. FIG. 6A is a right-side sectional view of the sliding surface 160 of the ramp loading unit 100, facing the magnetic disc 13. FIG. 6B is a left-side sectional view of the sliding surface 160 of the ramp loading unit 100 facing the magnetic disc 13. FIG. 6C is a plane view. FIGS. 5 and 6 show only the vicinity of the sliding surface 160 of the guide part 124 for convenience.

The convex (protruding) part 170 of the instant embodiment draws one level waveform sliding surface 160 that has a constant width, for example, of several millimeters. The waveform intersects with a locus which an arbitrary point on the lift tab 20 draws around the support shaft 15 or a locus L parallel to a concentric circle around the support shaft 15, as shown in FIG. 6A. This is because when the pattern of the convex (protruding) part 170 is parallel to the locus L (and particularly when the convex (protruding) part 170 is level), a contact position of the lift tab 20 with the convex (protruding) part 170 seldom fluctuates and the abrasive powder may possibly concentrates on the contact position. While the convex (protruding) part 170 has a waveform pattern in the instant embodiment, it may have an arbitrary shape that is not limited to the waveform as far as it extends in the width direction W of the sliding surface 160 relative to the locus L.

The instant embodiment forms the convex part 170 and the concaves or grooves 172 in the convex part 170. When the lift tab 20 passes through the concaves 172, the abrasive powder drops in the grooves 172 and the dropping amount onto the magnetic disc 13 reduces advantageously. The convex part 170 may be formed simultaneous with molding of the ramp loading unit 100, for example, polyacetal, or formed by injection molding, soldering, and adhesives. To the extent that the lift tab 20 is not prevented from smooth sliding, a material that absorbs the abrasive powder, such as a cloth, a sponge and other means, can be coated or arranged on the convex part 170 or in the groove 172. Alternatively, lubricant may be applied to the sliding surface 160. Thereby, a generation of the abrasive powder itself can be reduced. The lubricant can use, for example, fomblin system.

Figure 7:
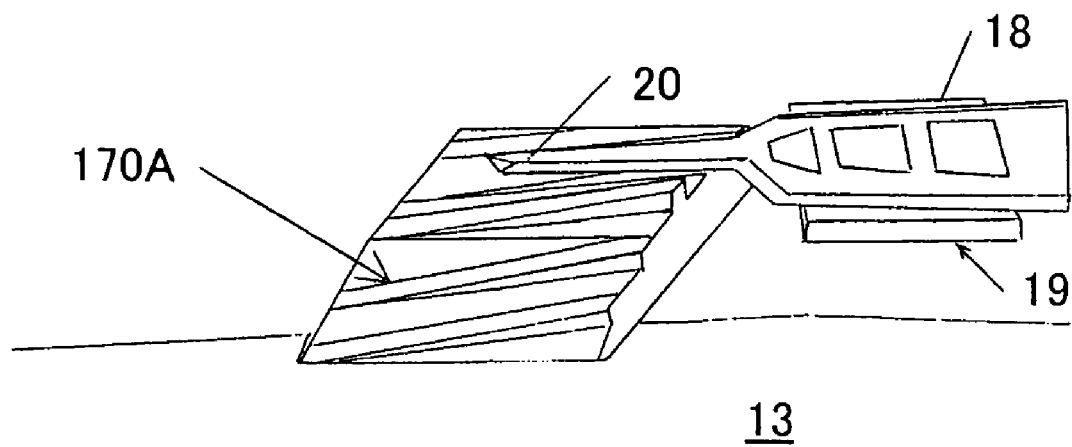
FIG. 7 is a schematic enlarged perspective view of a variation of the sliding surface of the ramp loading unit shown in FIG. 3.
Figure 8A:
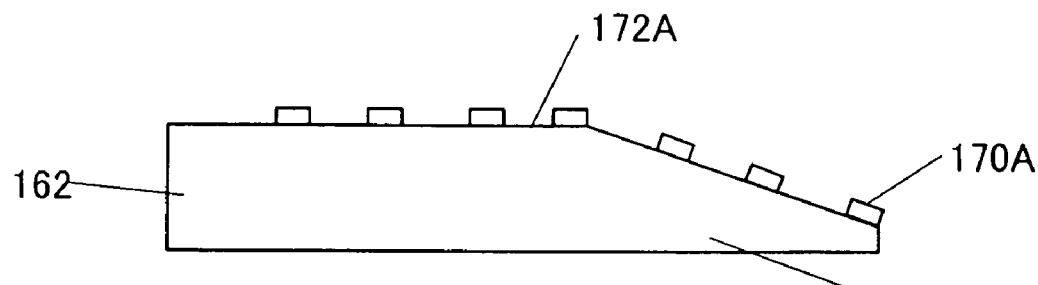
FIG. 8 shows a right-side sectional view, a left-side sectional view and a plane view of the sliding surface shown in FIG. 7, facing the magnetic disc.
Figure 8B:
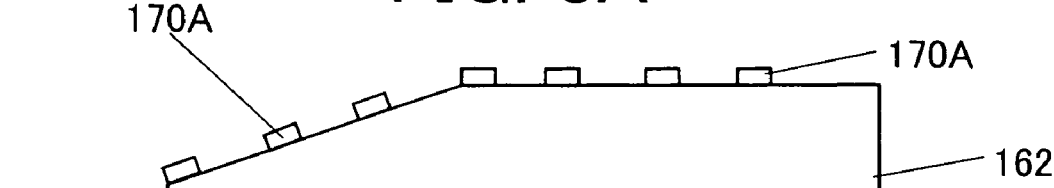
Figure 8C:
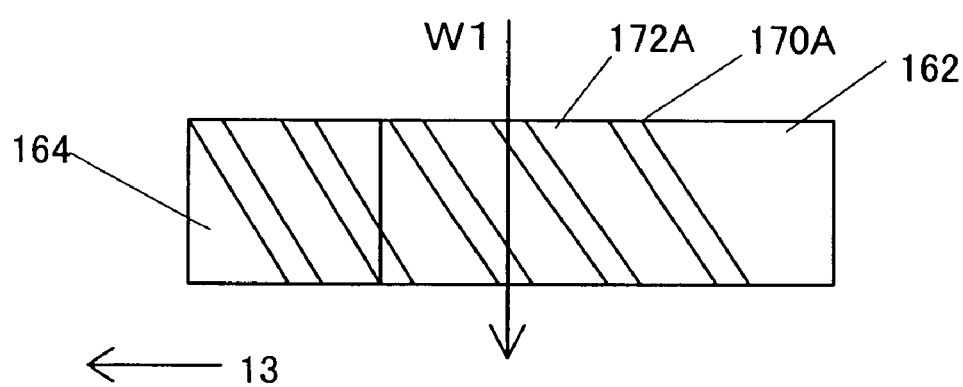

A description will be given of the convex part 170A as a variation of the convex part 170, with reference to FIGS. 7 and 8. Here, FIG. 7 is a schematic enlarged perspective view of the sliding surface 160 having the convex part 170A. FIG. 8A is a right-side sectional view of the sliding surface 160 that has the convex part 170A, facing the magnetic disc 13. FIG. 8B is a left-side sectional view, facing the magnetic disc 13. FIG. 8C is a plane view. Similarly, FIGS. 7 and 8 show only the vicinity of the sliding surface 160 of the guide part 124 for convenience.

The convex (protruding) part 170A of the instant embodiment has variable heights in the width direction of the sliding surface 160. More specifically, it includes plural triangle pillar having the height that increases from the right side to the left side facing the magnetic disc 13. Thus, the convex (protruding) part 170 may include variable heights and plural members. However, when the convex (protruding) part 170 includes plural members, it should intersect with the straight line W1 orthogonal to the direction F directing from the holding part 140 to the magnetic disc 13 over a range in which the lift tab 20 moves as shown in FIG. 8A, because unless it intersects, the lift tab 20 drops in the concave part 172A.

Since the instant embodiment also forms the concave parts or grooves 172A in the concave parts 170A as well as the convex (protruding) parts 170A, when the lift tab 20 passes through the grooves 172A, the abrasive powder drops in the grooves 172A and the dropping amount onto the magnetic disc 13 reduces advantageously.

In a part shown by the straight line W1 of the instant embodiment, the lift tab 20 moves from a right edge convex part 170A to a left edge convex (protruding) part 170A facing the magnetic disc 13. The right edge convex (protruding) part 170A is lower as shown in FIG. 8A, and the left edge convex part 170A is higher as shown in FIG. 8B. Such a step impacts the lift tab 20 to facilitate the abrasive powder to drop in the grooves 172A between the convex parts 170A. For similar purposes, a shape of the convex (protruding) part 170A may be determined so that the lift tab 20 falls when traveling two convex (protruding) parts 170A. For example, the height increasing direction may be alternate so that a certain convex (protruding) 170 increases its height from the right side to the left side facing the magnetic disc 13, and the adjacent convex (protruding) part increases from the left side to the right side facing the magnetic disc. Since a size of the abrasive powder ranges from 1 to several micrometers, a sufficient depth and a width of the groove 172A to remove the abrasive powder are about several hundreds micrometers. While the convex (protruding) parts 170A may be as wide as or different from the grooves 172A, a width that is not excessively wide is preferable to prevent generations of the abrasive powder.

The pressure plate 190 projects from the ramp 120, has a prism shape, and includes upper and lower surfaces approximately parallel to a surface of the magnetic disc 13. The pressure plate 190 serves to prevent fluctuations of the slider 19.

The HDD 1 includes, as a control system (not shown) a control part, an interface, a hard disc controller (referred to as "HDC" hereinafter), a write modulation part, a read demodulation part, and a head IC. The control part covers any processor such as a CPU and MPU irrespective of its name, and controls each part in the control system. The interface connects the HDD 1 to an external apparatus, such as a personal computer ("PC" hereinafter) as a host. The HDC sends to the control part data that has been demodulated by the read demodulation part, sends data to the write modulation part. The control part or HDC provides servo control over the spindle motor 14 and (a motor in) the actuator 21. The write modulation part modulates data and supplies data to the head IC, which data has been supplied from the host through the interface and is to be written down onto the magnetic disc 13 by an inductive head. The read demodulation part demodulates data into an original signal by sampling data read from the magnetic disc 13 by the MR head device. The write modulation part and read demodulation part may be recognized as one signal processing part. The head IC serves as a preamplifier.

In operation of the HDD 1, the control part (not shown) drives the spindle motor 14 and rotates the disc 13 in response to an instruction of the host, etc. The control part then controls the actuator 21 and rotates the carriage 16 around the support shaft 15. Initially, the lift tab 20 is held by the holding part 140 in the ramp loading unit 100, but the rotation of the carriage 16 moves the lift tab 20 from the holding part 140 to the sliding surface 160.

Next, the lift tab 20 slides on the flat part 162, convex part (protruding) 170 and 170A (generalized by "170" hereinafter) of the inclined part 164. Since the convex (protruding) part 170 intersects with the locus L and fluctuates in the width direction of the sliding surface 160, a contact position on the lift tab 20 with the convex (protruding) part 170 fluctuates. As a result, the abrasive powder that is generated by sliding extends in the longitudinal direction of the lift tab 20 and does not accumulate on one point. The abrasive powder drops in the groove 172 when the lift tab 20 passes through the groove 172. While the head 23 in the slider 19 is then sought onto a target track on the magnetic disc 13, the dropping amount of the abrasive powder reduces from the lift tab 20 to the magnetic disc 13. The remaining abrasive powder on the lift tab 20 does not coagulate is so light that the airflow associated with the rotation of the magnetic disc 13 is likely blow it away.

While the instant embodiment thus utilizes a swing arm system in which the slider 19 has an arc locus around the support shaft 15, the present invention allows an application of a slider system in which the slider 19 has a linear locus.

Unlike the CSS system, the ramp loading system is less likely to cause crashes when driving of the magnetic disc 13 starts, since the frictional force is not applied to the slider 19.

The airflow associated with the rotation of the magnetic disc 13 is introduced between the disc 13 and slider 19, forming a minute air film and thus generating the buoyancy that enables the slider 19 to float over the disc surface. On the other hand, the suspension 18 applies the elastic pressure onto the slider 19 in a direction against the buoyancy of the slider 19. The balance between the buoyancy and the elastic force spaces the slider 19 from the disc 13 by a constant distance.

In a write time, the control part (not shown) receives data from the host through the interface, selects the inductive head device, and sends data to the write modulation part through the HDC. In response, the write modulation part modulates the data, and sends the modulated data to the head IC. The head IC amplifies the modulated data, and then supplies the data as write current to the inductive head device. Thereby, the inductive head device writes down the data onto the target track.

In a read time, the control part (not shown) selects the MR head device, and sends the predetermined sense current to the sense-current control part through the HDC. Data is amplified by the head IC based on the electric resistance of the MR head device varying according to a signal magnetic field, and is then supplied to the read demodulation part to be demodulated to an original signal. The demodulated signal is sent to the host (not shown) through the HDC, control part, and interface.

According to the instant embodiment, the small dropping amount of the abrasive powder onto the magnetic disc 13 is less likely to cause crashes, providing stable recording and reproducing actions of the head 23 for a long period of time.

When the read and write process end, the control part controls the actuator 21 and rotates the carriage 16 around the support shaft 15 from the inner surface to the outer surface on the magnetic disc 13. Thereby, the lift tab 20 unloads the slider 19 from the magnetic disc 13, and moves to the holding part 140 through the sliding surface 160 in the ramp loading unit 100.

When the lift tab 20 slides on the flat part 162 and the convex part 170 of the inclined part 164, similar to the loading time, the abrasive powder that is generated by sliding extends in the longitudinal direction of the lift tab 20 and does not accumulate at one point. The abrasive powder drops in the groove 172 when the lift tab 20 passes through the groove 172. Thereby, the dropping amount of the abrasive powder onto the magnetic disc 13 reduces in the next seek action. The cover 130 restricts the perpendicular movements of the lift tab 20 in the holding part 140. The pressure plate 190 faces the free end of the suspension 18 with a clearance of about 0.1 mm, and restricts abnormal fluctuations of the suspension 18 or abnormal displacements of the slider 19.

The control part (not shown) controls the spindle motor 14 and stops the rotation of the magnetic disc 13. Unlike the CSS system, the ramp loading system is less likely to cause crashes when driving of the magnetic disc 13 starts, since the frictional force is not applied to the slider 19.

Further, the present invention is not limited to these preferred embodiments, and various modifications and changes may be made in the present invention without departing from the spirit and scope thereof. For example, the number of holding parts 140 and the number of sliding surfaces 160 are variable in the ramp loading unit 100 depending upon the number of discs 13 and the number of sliders 19. A type of the inventive record carrier is not limited to a magnetic disc the present invention is applicable to optical and other type of discs. While the lift tab 20 at the top of the suspension 18 slides on the ramp loading unit 100 in the instant embodiment, a portion in the suspension 18 which slides on the ramp loading unit is not limited to the lift tab 20.

The present invention thus does not concentrate a formation of the abrasive powder only on particular part of the head support part, and prevents dropping of the abrasive powder onto the record carrier, providing stable and reliable recording and reproducing actions. In addition, the reduced exchange frequency of the head and/or the record carrier provides good economic efficiency.

What is claimed is:

1. A ramp loading unit comprising:
   a holding part that holds a head support part at a position apart from a record carrier, the head support part supporting a head that records information in and reproduces the information from the record carrier; and
   a sliding part which the head support part elastically contacts when the head is to be loaded over the record carrier and the head is to be unloaded from the record carrier, the sliding part including a patterned sliding surface that faces the head support part, and can contact the head support part via a protruding part of the sliding surface, the protruding part of the sliding surface having a width that can partially contact the head support part,
   wherein a position of the protruding part changes in a width direction of the sliding surface along a length direction of the sliding surface orthogonal to the width direction, so that a contact position of the head support part with the protruding part can change as the head support part slides on the sliding part in the length direction of the sliding surface.

2. A ramp loading unit according to claim 1, further comprising lubricant applied onto the sliding part.

3. A ramp loading unit according to claim 1, wherein the protruding part in the patterned sliding surface has a constant height from a recessed portion of the patterned sliding surface.

4. A ramp loading unit according to claim 1, wherein the protruding part in the patterned sliding surface changes a height from a recessed portion of the patterned sliding surface.

5. A ramp loading unit according to claim 1, wherein the patterned sliding surface includes one or more protruding parts.

6. A ramp loading unit according to claim 1, wherein the patterned sliding surface includes plural protruding parts with such heights that the head support part travels different heights when the head support part moves from one protruding part to another protruding part.

7. A ramp loading unit according to claim 1, wherein the sliding part includes a cover that prevents vibrations of the head support part, and the head support part is located between the cover and the sliding surface.

8. A drive comprising:
a drive unit that drives a record carrier;
a head that records information onto and reproduces the information from the record carrier;
a head support part that supports said head; and
a ramp loading unit according to claim 1.

* * * * *